C. H. A. F. L. ROSS.
SIGHT FOR FIREARMS.
APPLICATION FILED NOV. 8, 1912.
1,055,801. Patented Mar. 11, 1913.
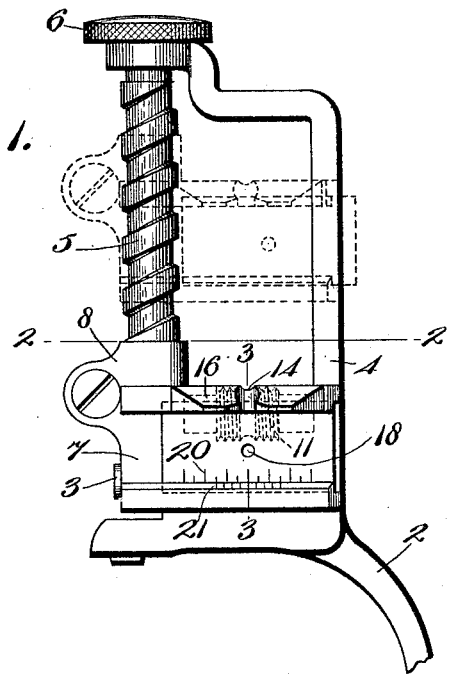
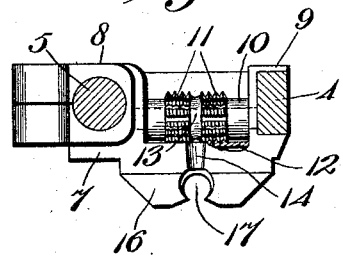
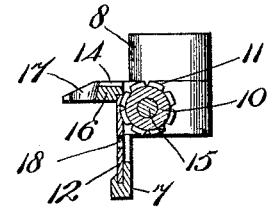
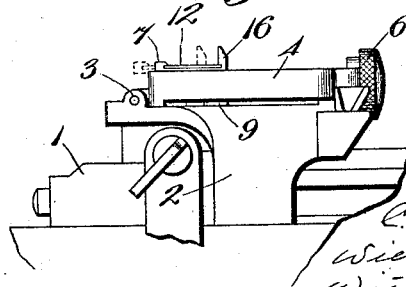

UNITED STATES PATENT OFFICE.

CHARLES HENRY AUGUSTUS FREDERICH LOCKHART ROSS, OF BALNAGOWN CASTLE, COUNTY OF ROSS, SCOTLAND.

SIGHT FOR FIREARMS.

1,055,801.  Specification of Letters Patent.  Patented Mar. 11, 1913.

Application filed November 8, 1912.  Serial No. 730,262.

*To all whom it may concern:*

Be it known that I, CHARLES H. A. F. L. Ross, a baronet, and a subject of the King of Great Britain, residing at Balnagown Castle, Rossshire, Scotland, have invented certain new and useful Improvements in Sights for Firearms; and I do hereby declare the following to be a full, clear, and exact description of the invention, such as will enable others skilled in the art to which it appertains to make and use the same.

This invention has for its object to produce an adjustable sight which will be simple in construction and more efficient in action than those heretofore proposed.

To these ends the invention consists in the novel details of construction and combinations of parts more fully hereinafter disclosed and particularly pointed out in the claims.

Referring to the accompanying drawings forming a part of this specification, in which like numerals designate like parts in all the views:—Figure 1 is an elevational view of a sight made in accordance with my invention; Fig. 2 is a cross-sectional view on the line 2—2 of Fig. 1; Fig. 3 is a cross-sectional view on the line 3—3 of Fig. 1; and Fig. 4 is a side elevational view of a portion of the receiver with the sight mounted thereon.

1 indicates the breech bolt, 2 the sight base or receiver, and 3 a pivot on which my sight leaf is mounted.

4 indicates one of the guide members of the pivoted leaf, and 5 the other member which is screw threaded as shown, and provided with the milled head 6.

7 represents the body of the slide member of my sight provided with the nut member 8 into which the threaded member 5 of the leaf fits, and also with the guide member 9 adapted to slide up and down on the leaf guide member 4 as shown. The nut member 8 and guide member 9 are preferably offset from the body portion 7 of the slide, as shown, and in the recess thus formed is mounted the adjusting screw sleeve 10 provided with the threads 11, fitting corresponding threads in the plate 12, slidingly mounted on the body portion 7.

15 represents a pin on which the sleeve 10 revolves.

13 represents a sight notch between the threads 11, registering with the notch 14 in the body portion 7. The said body 7 of the slide is also provided with an extension 16 projecting at right angles to its face, and provided with the sight opening 17, as shown. The sliding plate 12 is provided with the hole, or peep sight opening 18, which is laterally adjustable by the screw sleeve 10. The said plate 12 is further provided with the scale 20 adapted to coact with the scale 21 on the body portion 7 when allowing for the wind.

The operation of my sight is as follows:—When the leaf is folded down as shown in Fig. 4, the line of sight is over the plate 12 and through the opening 17. When the leaf is raised, the line of sight may be through the notches 14 and 13, when an open sight is desired, or through the peep opening 18 when a fine sight is wanted. By turning the screw threads 11, the plate 12 is moved laterally in either direction, and the scales 20 and 21 aid in allowing for the wind. By turning the milled head 6, the whole slide is raised or depressed at will in accordance with the range, and the slide may be so adjusted, as indicated by the dotted lines in Fig. 4, as to enable either the peep opening or the notches 14 and 13 to be used at point blank ranges.

What I claim is:—

1. In a sight the combination of a body portion; a plate having a peep opening mounted on said body portion; means provided with a sight notch for adjusting said plate and opening laterally; said body portion also provided with a sight notch registering with said first mentioned notch and located above said peep opening; and means for elevating said body portion and peep opening for different ranges, substantially as described.

2. In a sight the combination of a body portion having a pair of sight notches at right angles to each other; a plate having a peep opening located below one of said notches; and screw threaded means having a sight notch associated with the other of said notches and adapted to laterally adjust said plate and peep opening; substantially as described.

3. In a sight the combination of a body portion having a pair of sight notches at right angles to each other; a plate having a peep opening located below one of said notches; screw threaded means having a sight notch associated with the other of said notches and adapted to laterally adjust said plate and peep opening; a pivoted leaf on which said body portion is slidingly mounted; and screw threaded means for elevating said body portion and sight notches for different ranges, substantially as described.

4. In a sight the combination of a body portion having a pair of open sight notches at an angle to each other; a sliding plate provided with a scale and a sight opening carried by said plate; screw threaded means for laterally adjusting said plate; and a pivoted leaf on which said body portion is adjustable for different ranges, substantially as described.

In testimony whereof, I affix my signature, in presence of two witnesses.

CHARLES HENRY AUGUSTUS
FREDERICH LOCKHART ROSS.

Witnesses:
A. G. MUNRO,
L. E. POCOCK.

Copies of this patent may be obtained for five cents each, by addressing the "Commissioner of Patents, Washington, D. C."